No. 625,359. Patented May 23, 1899.
A. SEDGWICK.
AUTOMATIC FRICTION CLUTCH.
(Application filed Feb. 3, 1898.)
(No Model.)
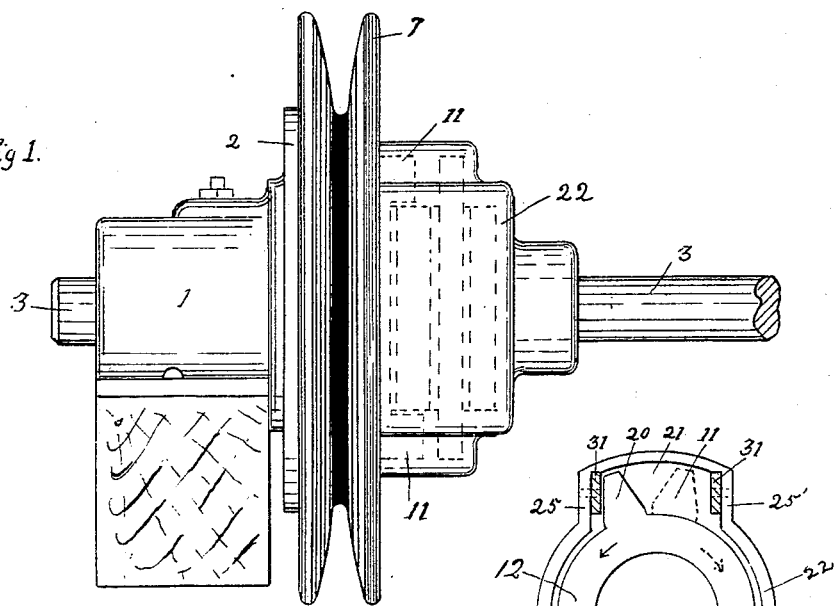
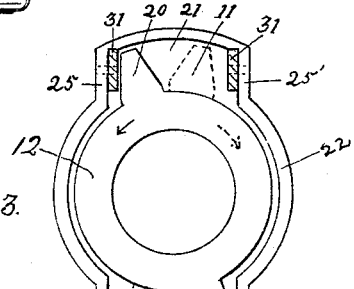
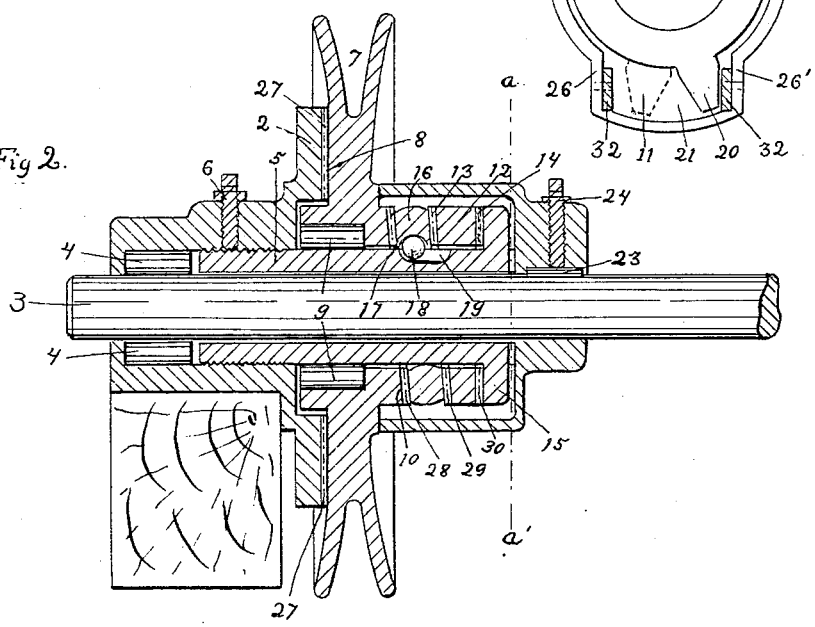
WITNESSES:
John J. Thompson
L. Parker Farrington
INVENTOR:
Alonzo Sedgwick
BY
ATTORNEY

UNITED STATES PATENT OFFICE.

ALONZO SEDGWICK, OF POUGHKEEPSIE, NEW YORK.

AUTOMATIC FRICTION-CLUTCH.

SPECIFICATION forming part of Letters Patent No. 625,359, dated May 23, 1899.

Application filed February 3, 1898. Serial No. 668,909. (No model.)

*To all whom it may concern:*

Be it known that I, ALONZO SEDGWICK, a citizen of the United States, residing at Poughkeepsie, in the county of Dutchess and State of New York, have invented new and useful Improvements in Automatic Friction-Clutches, of which the following is a specification.

My invention relates to improvements in automatic friction-clutches for dumb-waiters and the like; and the object is to simplify the construction, increase the efficiency, and provide a safe, reliable, and durable device of this character.

To this end the invention consists in the construction, combination, and arrangement of the several parts of the device, as will be hereinafter more fully described, and particularly pointed out in the claims.

The accompanying drawings show my invention in the best form now known to me; but many changes in the details might be made within the skill of a good mechanic without departing from the spirit of my invention as set forth in the claims at the end of this specification.

The same reference characters indicate the same parts of the invention.

Figure 1 is a side elevation of my improved automatic friction-clutch. Fig. 2 is a longitudinal section of the same. Fig. 3 is a detail view, partly in section, of the cylindrical sleeve and the collar loosely mounted thereon, the positions being shown in both full lines and dotted lines.

1 denotes a bearing-bracket fixed to a suitable support and formed with a plane brake-flange 2, and 3 represents a horizontal shaft journaled in said bracket, the bearing being an annular series of cylindrical rollers 4 4, interposed between the shaft and bracket. The flanged end of the bracket is internally threaded to receive the correspondingly-threaded end of a cylindrical sleeve 5, which encompasses the shaft and is adjustably secured in said bracket by means of the set-screw 6. 7 denotes a grooved pulley or hoist-wheel loosely mounted on said sleeve, its inner face 8 being formed with an annular plane bearing-surface arranged parallel with and contiguous to the brake-flange 2, and the same side of the hub is formed with an annular concentric chamber to receive the cylindrical rollers 9, which form the bearing for the pulley on the sleeve. The outer face 10 of the pulley-hub is inclined with reference to the plane in which the pulley rotates. It is also provided with opposite lugs 11 11, cast on it and fitted to engage with the hood 22 for the purpose of rotating the hoist-wheel, as hereinafter explained. 12 denotes a collar loosely mounted on said sleeve and having its inner plane face 13 inclined to reversely correspond to the inclined face 10 on the pulley-hub, while its outer plane face 14 is parallel with the annular shoulder 15, formed integral with and at a right angle to the axis of said sleeve. 16 denotes a plane washer encompassing said sleeve intermediate the pulley 7 and the collar 12, and at one point in its inner edge is formed a pocket 17 to receive the projecting surface of the ball-key 18, seated in the short longitudinal groove 19, formed in the sleeve 5, which prevents rotation of the washer on the sleeve, but permits its free lateral movement. The collar 12 is formed with two oppositely-disposed radial lugs 20 20, which, together with the hoist-wheel lugs 11 11, extend into the corresponding radial recesses 21 21, formed in the hood 22, fixed on the shaft 3 by means of the key 23 and set-screw 24. This hood 22 extends over the projecting end of the sleeve, the collar, the washer, and the inclined face of the hub of the pulley to form a protector or dustproof case for these parts and also for the purpose of operating the driving mechanism. The lateral parallel walls 25 25' and 26 26' of the hood project into the path of the radial lugs 11 11 and 20 20, which have a limited movement between them. A hand-wheel (not shown) is fixed at any convenient point on the shaft 3 for manipulating it.

27, 28, 29, and 30 denote friction-washers, which may be formed of leather, vulcanized or indurated fiber, or the like and are interposed between the contiguous faces of the parts to take up the wear and contribute to the noiseless working of the clutch. Strips 31 31 and 32 32 of similar material are fitted to the inner parallel faces of the walls of the hood to accomplish the same purpose, and when worn these washers and strips may be readily replaced, thus making the clutch as good as new for all practical purposes.

The operation of the device is as follows: When the thickest section of the collar 12 is opposed to the thinnest section of the hub of the grooved pulley 7, which is the position of said collar with reference to said hub when the radial lugs 11 11 and 20 20 are in contact with either one of the oppositely-disposed walls 25 and 26' of the hood, the pulley and shaft, with the attached hood, are free to revolve in either direction, and consequently the car or carriage may be moved up or down by means of the hand-wheel on the shaft 3. When, however, the hand-wheel is released, the car necessarily moves a very short distance up or down, depending on whether it is running light or loaded, and the corresponding movement of the hoist-pulley, the hood being left free and allowing the lugs 11 11 and 20 20 to move out of alinement, as shown by dotted lines in Fig. 3, causes the inclined face of its hub to assume the function of an annular wedge, thus crowding the collar 12 against the shoulder 15 on the sleeve and the annular bearing-face 8 of the pulley against the fixed brake-flange 2, thereby noiselessly and positively locking the car against an upward or downward movement and at the same time leaving it in condition for immediate travel when the hand-wheel is manipulated, the large bearing-surface of the brake operating to permit the gradual raising or lowering of the load without the usual strain and wear upon the various parts of the machine.

Having thus described my invention, what I claim, and desire to secure by Letters Patent, is—

1. A clutch-brake of the class described, comprising a fixed bracket provided with a stationary brake-flange, a bearing-sleeve secured in said bracket and formed with an annular shoulder; in combination with a pulley formed with a plane brake-face and loosely journaled on said sleeve between its annular shoulder and the bracket, and a hood, and means located within said hood for increasing or diminishing the distance between the said pulley and the annular shoulder on the sleeve, so as to bind or release the contiguous brake-surfaces on the pulley and the bracket at will, substantially as and for the purpose set forth.

2. A friction-clutch of the class described, comprising the stationary bracket 1 provided with a brake-flange 2, the bearing-sleeve 5 secured in said bracket and formed with an annular shoulder 15; in combination with a pulley 7 loosely journaled on said sleeve and formed with a brake-face, and a hub 10 having an inclined face, a hood, a collar 12 loosely mounted on said sleeve within said hood with its inclined face 13 arranged adjacent to the hub-face 10, and its face 14 opposite said shoulder 15, and means for rotating the collar on said sleeve independently of the rotation of said pulley, substantially as and for the purpose set forth.

3. A friction-clutch of the class described, comprising the stationary bracket 1, provided with the brake-flange 2, the bearing-sleeve 5 mounted in said bracket and formed with the annular shoulder 15; in combination with the pulley 7, loosely journaled on said sleeve and formed with a brake-face, an oppositely-disposed inclined face 10, a hood, the collar 12 loosely mounted on said sleeve within the hood and formed with an inclined face 13, and the washer 16 located within said hood and encompassing said sleeve intermediate said collar and pulley, substantially as and for the purpose set forth.

4. A friction-clutch of the class described comprising the stationary bracket 1, provided with a fixed brake-flange 2, the sleeve 5 adjustably secured in said bracket and formed with an annular shoulder 15 and a longitudinal groove 19; in combination with the pulley 7 loosely journaled on said sleeve and formed with a brake-face and an oppositely-disposed inclined face 10, the collar 12 loosely mounted on said sleeve, and formed with the inclined face 13, the washer 16 encompassing said sleeve between the collar and the pulley, and having at a point in its inner edge the pocket 17, and the key seated in said pocket, said key having a projecting surface extending into said groove in the sleeve, substantially as and for the purpose set forth.

5. A friction-clutch comprising the stationary bracket 1, provided with the flange 2, the sleeve 5 secured in said bracket and having a shoulder 15; in combination with the pulley 7 journaled on said sleeve and formed with the inclined face 10, the collar 12 loosely mounted on said sleeve and formed with the inclined face 13, the shaft 3 loosely journaled in said sleeve, means for communicating a rotary motion from said shaft to said collar, and a hood fixed to the shaft and inclosing the shoulder 15 and collar 12, substantially as and for the purpose set forth.

6. A friction-clutch comprising the bracket 1, provided with the flange 2, the sleeve 5 mounted in said bracket and having the shoulder 15; in combination with the pulley 7 journaled on said sleeve and formed with an inclined face 10, and also with lugs 11, the collar 12 loosely mounted on said sleeve and formed with an inclined face 13 and radial lugs 20 20, the shaft 3 loosely journaled in said sleeve, and the inclosing hood 22 fixed on said shaft and formed with recesses having parallel walls 25 25', substantially as and for the purpose set forth.

7. A friction-clutch, comprising the stationary bracket 1, provided with the flange 2, the sleeve 5 secured in said bracket and having the shoulder 15, in combination with the pulley 7 journaled in said sleeve and formed with the inclined face 10, the collar 12 loosely mounted on said sleeve and formed with the inclined face 13, the shaft 3 loosely journaled in said sleeve, and means for imparting a rotary motion from said shaft to said collar, as and for the purpose set forth.

8. A friction-clutch, comprising the bracket 1 provided with the flange 2, the sleeve 5 mounted in said bracket and having the shoulder 15, in combination with the pulley 7 journaled on said sleeve and formed with the inclined face 10, provided with lugs 11 11, the collar 12 loosely mounted on said sleeve and formed with the inclined face 13 and radial lugs 20 20, the shaft 3 loosely journaled in said sleeve, and the hood 22 fixed on said shaft and formed with recesses having parallel walls 25 25' adapted to receive said lugs, as and for the purpose set forth.

9. A friction-clutch comprising the bracket 1 provided with the brake-flange 2, the sleeve 5 mounted in said bracket and formed with the shoulder 16 and groove 19, in combination with the pulley 7 loosely journaled on said sleeve and formed with a plane brake-face arranged contiguous to said flange 2, and an oppositely-disposed inclined face 10, provided with the lugs 11 11, the collar 12 loosely mounted on said sleeve and formed with the radial lugs 20 20, the inclined face 13, and the oppositely-disposed plane face 14 arranged contiguous to said shoulder 15, the plane washer 16 encompassing said sleeve between the collar 12 and the pulley 7, and having in its inner edge the pocket 17, the ball-key 18 mounted part way in said pocket 17 and groove 19, the shaft 3 loosely journaled in said sleeve and the hood 22 fixed to said shaft, and having the recesses 21 21 formed between the integral parallel walls 25 25' and 26 26' to receive the said lugs 11 11 and 20 20 substantially as shown and described.

10. A friction-clutch, comprising a series of rotating surfaces having inclined faces operating as set forth, and having between two of the faces a plane washer 16, provided with a pocket 17 in combination with a bearing-sleeve 5, formed with a longitudinal groove 19, and a ball-key 18, adapted to rest in said pocket and groove for the purpose of permitting the free lateral movement of the washer, and of preventing its rotation on the sleeve, substantially as described.

In testimony whereof I have hereunto set my hand in the presence of two subscribing witnesses.

ALONZO SEDGWICK.

Witnesses:
   C. W. H. ARNOLD,
   IRVING ELTING.